United States Patent
Kahtava et al.

(10) Patent No.: US 10,334,538 B2
(45) Date of Patent: Jun. 25, 2019

(54) TELECOMMUNICATIONS APPARATUS AND METHODS FOR ACCESS CONTROL IN D2D COMMUNICATIONS

(71) Applicant: SONY CORPORATION, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/747,333

(22) PCT Filed: Jun. 30, 2016

(86) PCT No.: PCT/EP2016/065309
§ 371 (c)(1),
(2) Date: Jan. 24, 2018

(87) PCT Pub. No.: WO2017/032490
PCT Pub. Date: Mar. 2, 2017

(65) Prior Publication Data
US 2018/0220383 A1    Aug. 2, 2018

(30) Foreign Application Priority Data

Aug. 24, 2015 (EP) .................... 15182215

(51) Int. Cl.
*H04W 52/38* (2009.01)
*H04W 52/32* (2009.01)
(Continued)

(52) U.S. Cl.
CPC ........... *H04W 52/383* (2013.01); *H04W 4/40* (2018.02); *H04W 16/08* (2013.01);
(Continued)

(58) Field of Classification Search
None
See application file for complete search history.

(56) References Cited

U.S. PATENT DOCUMENTS

2013/0336120 A1   12/2013 Bai
2015/0099475 A1*   4/2015 Suzuki .................. H04B 1/525
                                                      455/79
(Continued)

FOREIGN PATENT DOCUMENTS

EP    2 276 012 A2    1/2011
EP    2 276 012 A3    1/2011

OTHER PUBLICATIONS

International Search Report dated Sep. 6, 2016, in PCT/EP2016/065309 filed Jun. 30, 2016.
(Continued)

*Primary Examiner* — Mohammed Rachedine
(74) *Attorney, Agent, or Firm* — Xsensus, LLP

(57) ABSTRACT

A terminal device for use in a wireless telecommunications system including plural terminal devices operable to communicate with one another in a device-to-device manner. The terminal device includes a controller and a transceiver configured to operate together to cause the terminal device to determine a transmission power level to use for device-to-device transmissions from the terminal device to restrict a number of other terminal devices able to receive the device-to-device transmissions to a restricted subset of the other terminal devices, and to transmit device-to-device communications using the determined transmission power level. The terminal device may determine the transmission power itself or from control signalling reads received from network infrastructure equipment, such as a base station or roadside unit.

18 Claims, 5 Drawing Sheets

(51) Int. Cl.
*H04W 52/28* (2009.01)
*H04W 52/24* (2009.01)
*H04W 4/40* (2018.01)
*H04W 28/02* (2009.01)
*H04W 16/08* (2009.01)
*H04W 76/14* (2018.01)

(52) U.S. Cl.
CPC ....... *H04W 28/021* (2013.01); *H04W 52/242* (2013.01); *H04W 52/283* (2013.01); *H04W 52/322* (2013.01); *H04W 28/0221* (2013.01); *H04W 76/14* (2018.02)

(56) References Cited

U.S. PATENT DOCUMENTS

| | | | |
|---|---|---|---|
| 2015/0195827 A1* | 7/2015 | Feng | H04L 63/0428 380/270 |
| 2015/0373766 A1* | 12/2015 | Morita | H04W 76/14 370/330 |
| 2016/0234789 A1* | 8/2016 | Oh | H04W 52/241 |

OTHER PUBLICATIONS

Holma, Harri et al., "LTE for UMTS OFDMA and SC-FDMA Based Radio Access", LTE, John Wiley and Sons, (2009), 4 pages.
Khorakhun, Chonlatee et al., "Congestion Control for VANETs based on Power or Rate Adaptation", WIT—5$^{th}$ International Workshop on Intelligent Transportation, (2008), pp. 99-104.

* cited by examiner

TELECOMMUNICATIONS APPARATUS AND METHODS FOR ACCESS CONTROL IN D2D COMMUNICATIONS

CROSS-REFERENCE TO RELATED APPLICATIONS

The present application is based on PCT filing PCT/EP2016/065309 filed Jun. 30, 2016, and claims priority to European Patent Application 15 182 215.2, filed in the European Patent Office on 24 Aug. 2015 the entire contents of each of which being incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which there is a desire for a group of terminal devices (communications devices) to exchange information with each other in a fast and reliable manner. In order to help address these limitations there have been proposed approaches in which terminal devices within a wireless telecommunications system may be configured to communicate data directly with one another without some or all their communications passing through an infrastructure equipment element, such as a base station. Such communications are commonly referred to generally as a device-to-device (D2D) communications. Many device-to-device communications may be transmitted by one device to a plurality of other devices in a broadcast like manner and so in that sense the phrase "device-to-device communications" also covers "device-to-devices communications".

Thus, D2D communications allow communications devices that are in sufficiently close proximity to directly communicate with each other, both when within the coverage area of a network and when outside a network's coverage area (e.g. due to geographic restrictions on a network's extent or because the network has failed or is in effect unavailable to a terminal device because the network is overloaded). D2D communications can allow user data to be more efficiently and quickly communicated between communications devices by obviating the need for user data to be relayed by a network entity such as a base station. D2D communications also allow communications devices to communicate with one another even when one or both devices may not be within the reliable coverage area of a network. The ability for communications devices to operate both inside and outside of coverage areas makes wireless telecommunications systems that incorporate D2D capabilities well suited to applications such as public protection/safety and disaster relief (PPDR), for example. PPDR related communications may benefit from a high degree of robustness whereby devices can continue to communicate with one another in congested networks and when outside a coverage area. 3GPP has developed some proposals for such public safety D2D use in LTE networks in Release12.

The automotive industry has been working for several years on solutions to enable communication with and between vehicles, e.g. to help improve traffic flow and safety. These techniques can range from automatic tolling technologies to collision prevention mechanisms, and are generally known as Intelligent Transport Systems (ITS). Currently, the main radio technology under consideration in standards projects relating to ITS is a WLAN derivative 802.11p, which would be used for broadcasting ITS information by vehicles or road side infrastructure to other vehicles. This constitutes so-called Dedicated Short Range Communication (DSRC) system that is deployed at 5.9 GHz ITS band in Europe and North America (there may be different ITS bands in use in other regions, e.g. 700 MHz in Japan).

The effective range of DSRC systems is a few hundred meters and the services are broadcast oriented (emergency vehicle notices, for example).

However, there have been also proposals for communications based on those used in mobile telecommunications systems, such as Long Term Evolution (LTE) based networks operating on International Mobile Telecommunications (IMT) bands, to help support ITS applications, for example to provide more capacity and potentially provide for wider and cheaper coverage. In particular, where the existing cellular network already covers roadways the capital expenditure costs associated with using cellular mobile telecommunications techniques for ITS applications may be significantly less than what would be needed for setting up a new DSRC-based ITS network.

Accordingly, an Intelligent Transport System may rely on D2D communications of the kind proposed for mobile wireless telecommunications systems to allow vehicles to communicate with one another and with other terminal devices or network infrastructure equipment, such as a base station or specific road side infrastructure. In this regard, communications associated with connected vehicle systems may be conveniently referred to as V2X (vehicle-to-everything) communications, which may comprise V2V (vehicle-to-vehicle), V2P (vehicle-to-pedestrian) and V2I (vehicle-to-infrastructure). Infrastructure in this case may be a roadside ITS related infrastructure element, which may be referred to as a road side unit (RSU), or a conventional Internet or mobile network infrastructure element. Some examples or services in connected a vehicle context are Cooperative Awareness Message (CAM) and Decentralised Environmental Notification (DEN). These constitute applications such as allowing emergency vehicles to broadcast their presence and allowing roadside infrastructure to broadcast speed limit information to vehicles.

It has been proposed that V2X communications may be implemented using dedicated Road Side Units (RSUs) which communicate with vehicles and which assign radio resources for use by the vehicles in V2X communications. In particular, such RSUs may allocate D2D radio resources for use in V2X communications. Nonetheless, it is also to be expected that there may be situations where vehicles will wish to autonomously communicate directly with one another (V2V) without any network infrastructure interaction, for example because not all the roadways may have RSUs installed, particularly in more rural areas.

One issue to be addressed for reliable D2D communications, which may be particularly relevant in a V2V context, is the possibility of large numbers of devices needing to be in rapid and reliable communication giving rise to undue congestion and interference on the radio interface.

To seek to address this issue EP 2 276 012 [1] proposes a method for controlling the transmission power of a driven vehicle in a vehicle-to-vehicle communication environment that includes classifying vehicles whose transmissions are received at the driven vehicle into groups and adjusting the transmission power of the driven vehicle based on the classification results. In particular the received vehicles are classified relative to the driven vehicle into vehicles on the same road, vehicles on an opposite road and vehicles on other roads. This classification is said to allow analysis and processing of a safety risk which is accounted for in the power setting. In some embodiments, only received vehicles traveling on other roads are used in a decision to increase power, while vehicles on an opposite road are ignored.

Another approach for dealing with congestion is described in US 2013/0336120 [2] which proposes a vehicle communication system in which a host vehicle transmits and receives driving information to and from surrounding vehicles to find out information about position, speed, driving direction, to help decrease traffic accident risk. Because transmission and reception of the driving information may be subject to congestion, an approach is proposed for performing data transmission and reception between vehicles in a way that depending on surrounding communication conditions by setting a time frame variably depending on surrounding communication conditions and transmitting data on the basis of the changed time frame.

Despite these previous proposals, the inventors have recognised there still remains a need for improved schemes for managing the risk of congestion for device-to-device communications in wireless telecommunications systems, for example in the context of Intelligent Transport Systems.

SUMMARY

According to a first aspect of certain embodiments there is provided a terminal device for use in a wireless telecommunications system comprising a plurality of terminal devices operable to communicate with one another in a device-to-device manner, wherein the terminal device comprises a controller unit and a transceiver unit configured to operate together to cause the terminal device to determine a transmission power level to use for device-to-device transmissions from the terminal device to restrict the number of the other terminal devices able to receive the device-to-device transmissions to a restricted subset of the other terminal devices, and to transmit device-to-device communications using the determined transmission power level.

According to a second aspect of certain embodiments there is provided integrated circuitry for a terminal device in a wireless telecommunications system comprising a plurality of terminal devices operable to communicate with one another in a device-to-device manner, wherein the integrated circuitry comprises a controller element and a transceiver element configured to operate together to cause the terminal device to determine a transmission power level to use for device-to-device transmissions from the terminal device to restrict the number of the other terminal devices able to receive the device-to-device transmissions to a restricted subset of the other terminal devices, and to transmit device-to-device communications using the determined transmission power level.

According to a third aspect of certain embodiments there is provided a method of operating a terminal device in a wireless telecommunications system comprising a plurality of terminal devices operable to communicate with one another in a device-to-device manner, wherein the method comprises determining a transmission power level to use for device-to-device transmissions from the terminal device to restrict the number of the other terminal devices able to receive the device-to-device transmissions to a restricted subset of the other terminal devices, and transmitting device-to-device communications using the determined transmission power level.

According to a fourth aspect of certain embodiments there is provided network infrastructure equipment for use in a wireless telecommunications system comprising the network infrastructure equipment and a plurality of terminal devices operable to communicate with one another in a device-to-device manner, wherein the network infrastructure equipment comprises a controller unit and a transceiver unit configured to operate together to cause the network infrastructure element to determine an indication of where a terminal device is located, and, based on the indication of where a terminal device is located, determine a transmission power level for the terminal device to use for device-to-device transmissions to restrict the number of other terminal devices able to receive the device-to-device transmissions to a restricted subset of the other terminal devices, and to communicate power control information to the terminal device to cause the terminal device to use the determined transmission power level for device-to-device communications.

According to a fifth aspect of certain embodiments there is provided integrated circuitry for network infrastructure equipment in a wireless telecommunications system comprising the network infrastructure equipment and a plurality of terminal devices operable to communicate with one another in a device-to-device manner, wherein the integrated circuitry comprises a controller element and a transceiver element configured to operate together to cause the network infrastructure equipment to determine an indication of where a terminal device is located, and, based on the indication of where a terminal device is located, determine a transmission power level for the terminal device to use for device-to-device transmissions to restrict the number of other terminal devices able to receive the device-to-device transmissions to a restricted subset of the other terminal devices, and to communicate power control information to the terminal device to cause the terminal device to use the determined transmission power level for device-to-device communications.

According to a sixth aspect of certain embodiments there is provided a method of operating network infrastructure equipment in a wireless telecommunications system comprising the network infrastructure equipment and a plurality of terminal devices operable to communicate with one another in a device-to-device manner, wherein the method comprises determining an indication of where a terminal device is located, and, based on the indication of where a terminal device is located, determining a transmission power level for the terminal device to use for device-to-device transmissions to restrict the number of other terminal devices able to receive the device-to-device transmissions to a restricted subset of the other terminal devices, and communicating power control information to the terminal device to cause the terminal device to use the determined transmission power level for device-to-device communications.

According to a seventh aspect of certain embodiments there is provided a wireless telecommunications system comprising a plurality of terminal devices operable to communicate with one another in a device-to-device manner and network infrastructure equipment, wherein at least one of the terminal devices comprises a terminal device according to the first aspect of certain embodiments and/or the network infrastructure equipment comprises network infrastructure equipment according to the fourth aspect of certain embodiments.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
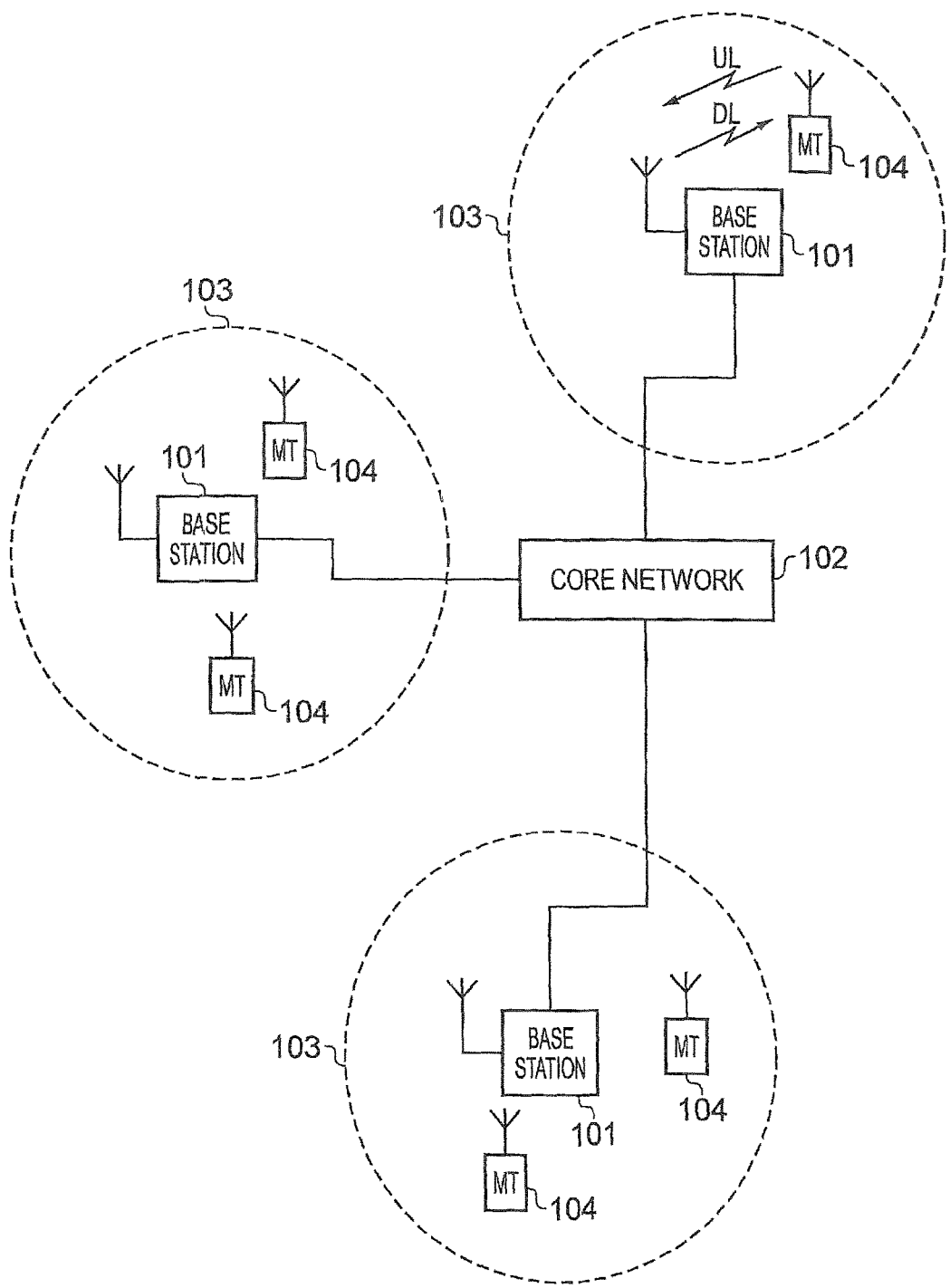
FIG. 1 provides a schematic diagram illustrating an example of a mobile telecommunication system.

FIG. 1 provides a schematic diagram illustrating some basic functionality of a mobile (cellular) telecommunications network/system 100, in this example operating generally in accordance with LTE principles, and which may be adapted to implement embodiments of the disclosure as described further below. Various elements of FIG. 1 and their respective modes of operation are well-known and defined in the relevant standards administered by the 3GPP® body, and also described in many books on the subject, for example, Holma, H. and Toskala, A. [3]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network 100. The core network 102 routes data to and from the terminal devices 104 via the respective base stations 101 and provides functions such as authentication, mobility management, charging and so on. In addition to the base stations 101 and terminal devices 104, the system 100 further comprises one or more relay nodes/devices 105. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, and so forth. Similarly, base stations may also be referred to as transceiver stations/nodeBs/e-nodeBs, and so forth. Furthermore, relay nodes may also be referred to as relay devices/relays, and so forth. In some example implementations of the present disclosure, a terminal device may be operating as a relay node to assist in supporting communications associated with other terminal devices. That is to say, the functionality of a relay device may be provided by a suitably configured terminal device.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
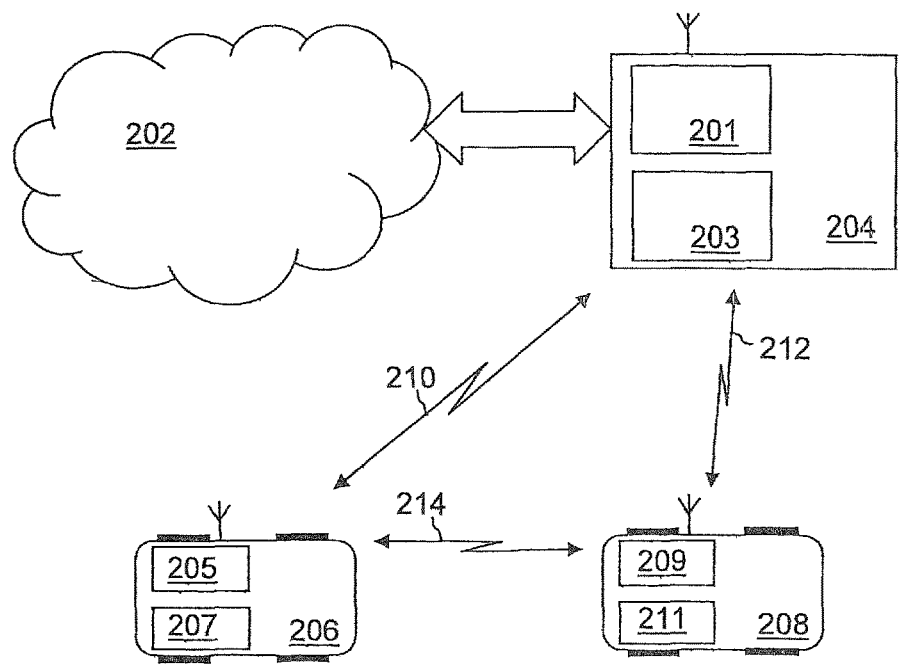
FIG. 2 schematically represents a wireless telecommunications system according to certain embodiments of the disclosure.

FIG. 2 schematically shows a telecommunications system 200 according to an embodiment of the disclosure. In particular, FIG. 2 represents an operating scenario in the context of an Intelligent Transport System (ITS) scheme whereby vehicles equipped with terminal devices are configured to support device-to-device communications (vehicle-to-vehicle communications) to allow them to communicate with one another to exchange information using the radio resources of the wireless telecommunications system 200. The telecommunications system 200 in this example is based broadly on a LTE-type architecture with modifications to support device-to-device communications (i.e. direct signalling exchange between terminal devices to communicate data between them) generally in accordance with previously proposed schemes for D2D communications. As such many aspects of the operation of the telecommunications system 200 are already known and understood and not described here in detail in the interest of brevity. Operational aspects of the telecommunications system 200 which are not specifically described herein may be implemented in accordance with any known techniques, for example according to the established LTE-standards and known variations and modifications thereof (e.g. to provide/introduce support for D2D communications in a vehicle-to-vehicle/ITS context).

It will be appreciated the information content of the communications between the vehicles is not significant to the principles underlying the operations described herein. Thus in any given case the information content will depend on the implementation at hand and the functionality the particular ITS scheme provides. For example, in some implementations the information exchanged through the vehicle-to-vehicle communications may comprise information regarding the speed and direction of the respective vehicles and relevant operating characteristics, such as whether the vehicle brakes are being applied and whether the vehicle is indicating an intention to turn/change direction.

The telecommunications system 200 comprises a core network part (evolved packet core) 202 coupled to a radio network part. The radio network part comprises a base station (evolved-nodeB) 204, a first terminal device 206 and a second terminal device 208. Each terminal device is deployed within a vehicle for providing vehicle-to-vehicle communication functionality. It will of course be appreciated that in practice the radio network part will comprise a plurality of base stations serving a larger number of terminal devices (vehicles) across various communication cells. However, only a single base station and two terminal devices are shown in FIG. 2 in the interests of simplicity for this figure.

As with a conventional mobile radio network, the terminal devices 206, 208 are arranged to communicate data to and from the base station (transceiver station) 204. The base station is in turn communicatively connected to a serving gateway, S-GW, (not shown) in the core network part which is arranged to perform routing and management of mobile communications services to the terminal devices in the telecommunications system 200 via the base station 204. In order to maintain mobility management and connectivity, the core network part 202 also includes a mobility management entity (not shown) which manages the enhanced packet service, EPS, connections with the terminal devices 206, 208 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 2 may be broadly conventional apart from where modified to provide functionality in accordance with embodiments of the disclosure as discussed herein. It will further be appreciated that for other implementations which are based around wireless telecommunications systems operating in accordance with different standards, the network architecture may be correspondingly different.

The first and second terminal devices 206, 208 are D2D (more specifically, V2V) enabled devices configured to operate in accordance with embodiments of the present disclosure as described herein. The terminal devices 206, 208 each comprise a respective transceiver unit 205, 209 for transmission and reception of wireless signals and a respective controller unit 207, 211 configured to control the respective terminal devices 206, 208. The respective controller units 207, 211 may each comprise a processor unit which is suitably configured/programmed to provide the desired functionality using conventional programming/configuration techniques for equipment in wireless telecommunications systems. The respective transceiver units 205, 209 and controller units 207, 211 are schematically shown in FIG. 2 as separate elements. However, it will be appreciated for each of the terminal devices the functionality of the terminal device's receiver and controller units can be provided in various different ways, for example using a single suitably programmed general purpose computer, or suitably configured application-specific integrated circuit(s)/circuitry. It will be appreciated the first and second terminal devices 206, 208 will in general comprise various other elements associated with their operating functionality in accordance with established wireless telecommunications techniques (e.g. a power source, possibly a user interface, and so forth).

The base station 204 is configured to support communications with the terminal devices and may also in some situations for some examples play a role in configuring aspects of D2D communications between the terminal devices, for example establishing which radio resources may be used for D2D communications between terminal devices operating within the coverage area of the base station 204. The base station 204 comprises a transceiver unit 201 for transmission and reception of wireless signals and a controller unit 203 configured to control the base station 204. The controller unit 203 may comprise a processor unit which is suitably configured/programmed to provide the desired functionality using conventional programming/configuration techniques for equipment in wireless telecommunications systems. The transceiver unit 201 and the controller unit 203 are schematically shown in FIG. 2 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 204 will in general comprise various other elements associated with its operating functionality. For example, the base station 204 will in general comprise a scheduling entity responsible for scheduling communications. The functionality of the scheduling entity may, for example, be subsumed by the controller unit 203.

Thus, the base station 204 is configured to communicate data with the first terminal device 206 over a first radio communication link 210 and communicate data with the second terminal device 208 over a second radio communication link 212. Both radio links may be supported within a single radio frame structure associated with the base station 204. It is assumed here the base station 204 is configured to communicate with the terminal devices 206, 208 over the respective radio communication links 210, 212 generally in accordance with the established principles of LTE-based communications. Nevertheless, it will be appreciated that some embodiments may be implemented without the respective terminal devices undertaking any base station communications, and in this regard the principles described herein with regards to vehicle-to-vehicle communications may for some implementations be undertaken regardless of whether the respective vehicles (mobile terminals) are in coverage or out of coverage of a base station.

In addition to the terminal devices 206, 208 being arranged to communicate data to and from the base station (transceiver station) 204 over the respective first and second radio communication links 210, 212, the terminal devices 206, 208 are further arranged to communicate with one another (and other terminal devices within the wireless telecommunications system) in a device-to-device (D2D) manner over a D2D radio communication link 214, as schematically indicated in the figure. The underlying principles of the D2D communications supported in the wireless telecommunications system of FIG. 2 may follow any previously proposed techniques, but with modifications to support approaches in accordance with embodiments of the disclosure as described herein.

Figure 3:
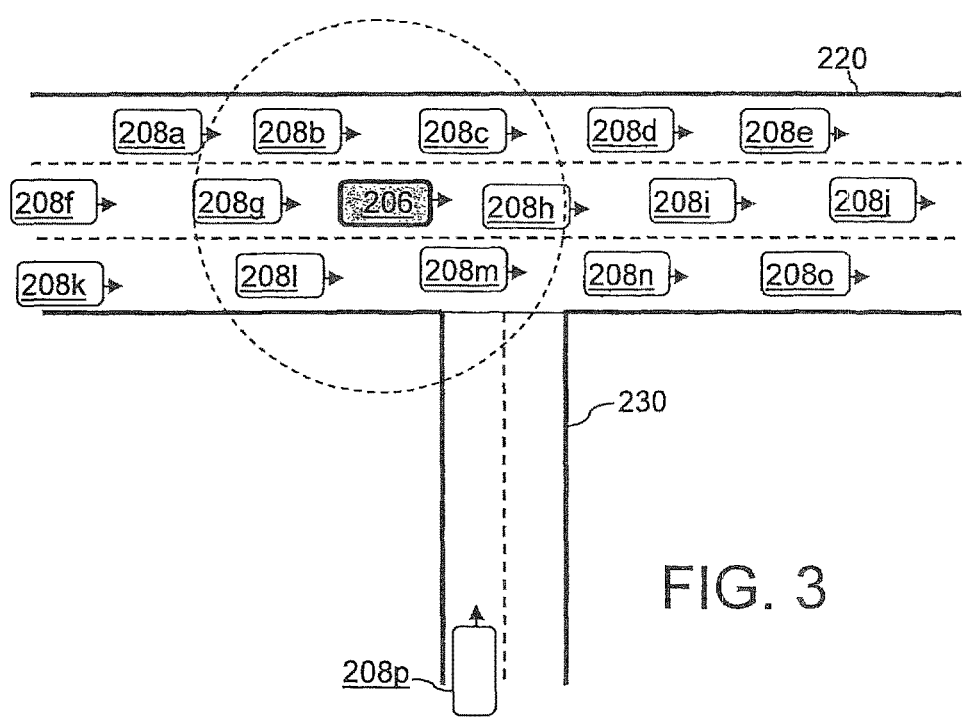
FIGS. 3 and 4 schematically represent a terminal device undertaking device-to-device communications with a plurality of other terminal device in the context of vehicle-to-vehicle communications for different traffic densities in accordance with certain embodiments of the disclosure.
Figure 4:
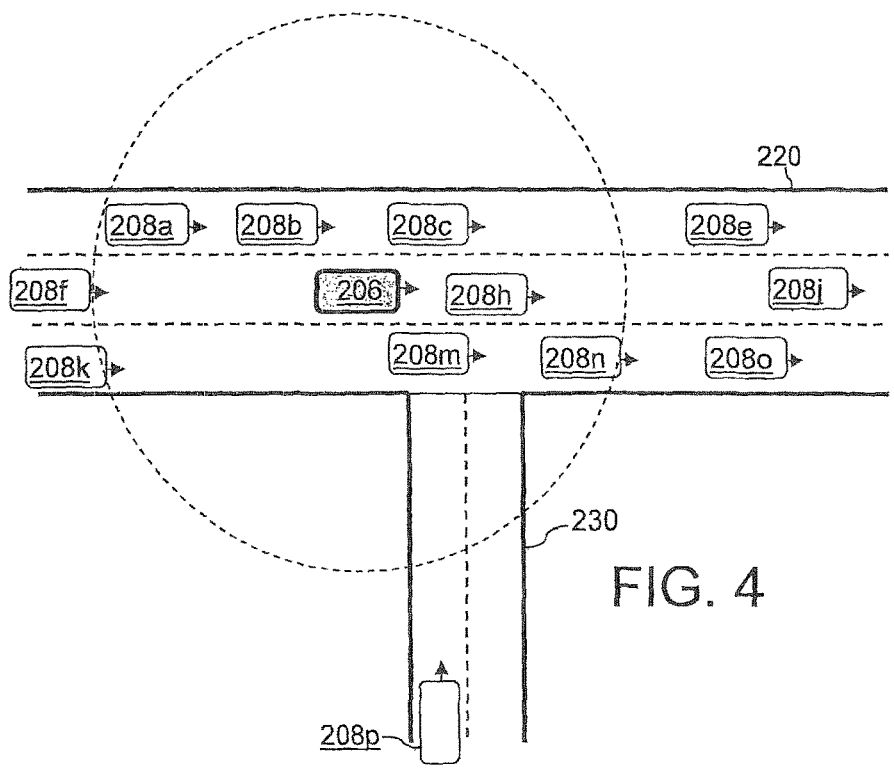

FIGS. 3 and 4 schematically represent two different operating scenarios in which D2D communications may be exchanged in the context of an ITS scheme in accordance with certain embodiment of the disclosure. Both FIGS. 3 and 4 schematically represent the same portion of a road network comprising a main road 220 and a side road 230 being used by a plurality of vehicles. However, FIG. 3 represents a scenario of relatively heavy traffic (as compared to FIG. 4) while FIG. 4 represents a scenario of relatively light traffic (as compare to FIG. 3). The respective vehicles are each equipped with a terminal device supporting D2D communications in accordance with certain embodiment of the disclosure. In that respect, the vehicles represented in FIGS. 3 and 4 are identified by reference numerals corresponding to those also used herein for terminal devices operating in accordance with embodiments of the disclosure. It is assumed here for simplicity that all vehicles using the road network support such D2D communications, but in other implementations there may be other vehicles using the road network which do not support these communications, and these vehicles will play no active role in the methods of operation described herein and in that respect may be ignored for the purposes of explaining the methods described herein.

A method of operation will be described from the particular point-of-view of one terminal device 206 (shown shaded in FIG. 3) in respect of its interactions with a plurality of other terminal devices 208a, 208b, . . . 208O (collectively 208). However, it will be appreciated that all terminal devices will in essence be operating in the same way. That is to say, the operations described herein with respect to how terminal device 206 interacts with the other terminal devices 208 will be the same as how each of the other terminal devices interact with other terminal devices using the road network, including terminal device 206.

In FIGS. 3 and 4 the majority of terminal devices 206, 208 are on the main road 220 travelling in the same direction (the direction of travel for each terminal device is as indicated by an arrow). However, in each figure there is also one terminal device, 208p, travelling on the side road 230 towards a junction at which the side road 230 joins the main road 220. It will be appreciated that in practice a main road such as that represented in FIGS. 3 and 4 may also be associated with an adjacent section of road for vehicles travelling in the opposite direction. Whether or not these vehicles are involved in the methods described herein may depend on implementation. For example, in some cases it may be considered the period of time during which counter-travelling vehicles are in communication range is too low to merit supporting communications between them, in this case, the vehicles may communicate an indication of their direction of travel, and may be discounted from further consideration in the processing described herein if it is determined they are travelling in an opposite direction or the magnitude of their velocity differential is greater than a threshold amount.

Figure 5:
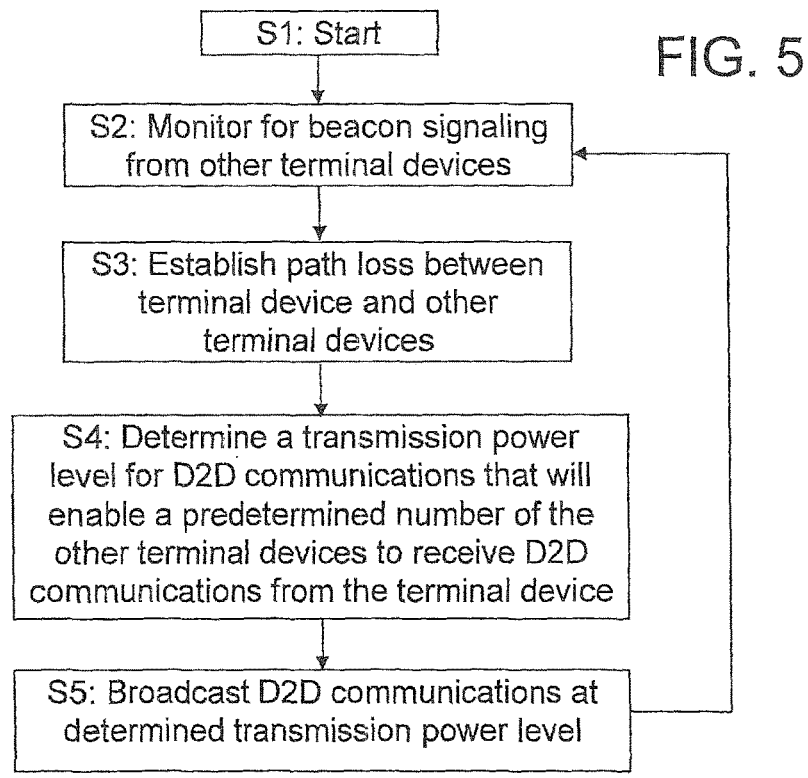
FIGS. 5 and 6 are flow diagrams schematically representing methods of operating a terminal device in accordance with some embodiments of the disclosure.

FIG. 5 is a flow diagram schematically representing a method of operation for the terminal device 206 in accordance with an embodiment of the disclosure. As noted above, this processing is described in the context of terminal device 206 for the sake of a specific example, but the processing will also be performed in parallel by all the other terminal devices configured to engage in device-to-device (vehicle-to-vehicle in this example) communications in accordance with embodiments of the disclosure.

Processing starts in step S1. In general, once the process is running it is performed in a repeating loop manner. In this regard the initial start point represented in FIG. 5 may correspond with when a new session is initiated. This may correspond, for example, with when the terminal device 206 is first switched on, or when the vehicle in which terminal device is arranged begins driving, or when an operator of the relevant vehicle activates the ITS functionality provided by the D2D communications discussed herein. Similarly, and although not shown in FIG. 5, the processing may continue repeating as described below until the process is terminated, for example with the terminal device being automatically deactivated once the vehicle is switched off or a user deactivates their use of the ITS functionality.

In step S2 the terminal device 206 monitors for beacon signalling transmitted by other surrounding terminal devices. In accordance with embodiments of the disclosure, all terminal devices, including the terminal device 206, are configured to transmit beacon signalling in accordance with a predefined schedule to allow other terminal devices to in effect determine a radio path loss between them. For example, the beacon signalling may be transmitted at a transmission power level that can be derived by a receiving terminal device, for example because it is predefined in a standard or through previous configuration signalling, or because an indication of the transmission power is conveyed in association with the beacon signalling itself. The respective terminal devices may, for example, transmit their beacon signalling at a power level which is sufficient to allow a terminal device to receive the beacon signalling at the largest offset distance that the D2D implementation is intended to support.

In step S3 the terminal device establishes a path loss associated with the beacon signalling received from respective ones of the other terminal devices. This allows the terminal device 206 to in effect determine the distance to each of the terminal devices within range for potential D2D communication.

In step S4 the terminal device determines a transmission power to use for its own D2D communications that will enable a restricted subset, e.g. a predetermined number, of the other terminal devices to receive its D2D communications. This may be determined from the terminal device's estimates of the path loss between itself and respective ones of the other terminal devices established in step S3, assuming reciprocity of radio conditions. For example, if for a given implementation it is decided the respective terminal devices should transmit their D2D transmissions at a power level that will only allow the nearest 6 other terminal devices to receive the transmissions to avoid over congestion in signalling exchange between the various terminal devices, in step S4 the terminal device can determine a transmission power that is just sufficient to allow the six nearest other terminal device to receive the signalling. That is to say, the terminal device can set it is transmission power for its D2D signalling to just overcome the sixth lowest path loss determined in step S3.

In step S5, the terminal device 206 proceeds to broadcast one or more D2D communications at the determined transmission power level. Processing may then return to step S2 for another loop in accordance with a predetermined timing schedule for the beacon signalling, for example this may be performed once every few seconds or so.

Thus, in relatively heavy traffic conditions, such as represented in FIG. 3, the terminal device will determine that it should establish a relatively low transmission power level for its D2D communications so that only six other terminal devices can receive its D2D transmissions. This is schematically indicated in FIG. 3 by the dashed circle centred on the terminal device 206 which schematically indicates the range over which its transmissions can be received at the selected power level. Conversely, in relatively light traffic conditions, such as schematically represented in FIG. 4, the terminal device 206 will determined that it should establish a relatively high transmission power level for its D2D communications while still ensuring only six other terminal devices can receive its D2D transmissions. This is schematically indicated in FIG. 4 by the dashed circle centred on the terminal device 206 which schematically indicates the range over which its transmissions can be received at the selected power level.

Thus, the approach schematically represented in FIG. 5 allows a terminal device to select an appropriate power level to restrict the number of other terminal devices that can receive its D2D transmissions. The other terminal devices 208*a*, 208*b*, . . . 208*o* may also determine their own respective transmission power levels for their own D2D transmissions in a similar way so that overall each terminal device is transmitting at a transition power level that would allow only its six nearest neighbours to receive its communications. In this regard it will be appreciated that although not shown in FIG. 5, the terminal device 206 will also transmit beacon signalling of the kind described above to be used by the other terminal devices 208 in selecting their own respective transmission power levels. This approach in which individual terminal devices manage their own transmission power levels can therefore help reduce overall signalling congestion, for example because terminal device 208*j* is not required to receive and decode D2D transmissions from terminal device 206 which are less relevant to the terminal device 208*j* than D2D transmissions from its own nearest neighbours.

Figure 6:
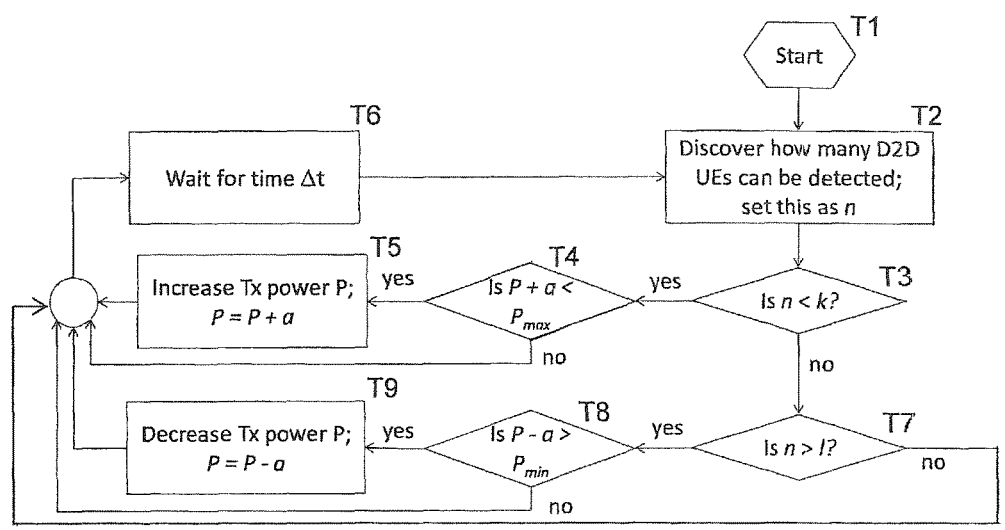

An alternative to the approach based on beacon signalling represented in FIG. 5 is schematically shown in the flow diagram of FIG. 6. The approach of FIG. 6 is based on a scheme whereby individual terminal devices transmit their D2D transmissions on an ongoing basis using a transmission power level that is adjusted in dependence on the number of other devices from which they are detecting D2D transmissions (i.e. the approach does not use dedicated beacon signalling). To help operate cohesively, the scheme in this implementation is based on all terminal devices communicating in a group adjusting their transmission powers in parallel, i.e. around the same times, for example in accordance with a predefined power adjustment schedule. For example, each terminal device may be configured to synchronously undertake the processing of FIG. 6 to adjust their power every few seconds or so. Alternatively, individual terminal devices which detect that they are not receiving signals from enough other devices, or are receiving signals from too many other devices, may be configured to trigger a power readjustment process, for example by broadcasting appropriate control signalling with a power level sufficient to be received by all terminal devices within the vicinity. In this example it is assumed the implementation is one in which it is determined that individual terminal devices should aim to receive signals from between k and l other terminal devices. For example, it may be considered that 6 is the optimum number of terminal devices with which to be in communication, but that it is nonetheless acceptable to be communicating with 5 or 7 terminal devices without undertaking a transmission power level adjustment. The specific values of k and l will depend on the implementation at hand, and may, for example, depend on the processing capabilities of the individual terminal devices. For example, terminal devices with relatively high processing capability may be configured to maintain communications with a correspondingly higher number of other terminal devices. In general there will be a compromise between providing the terminal devices with access to the maximum amount of information being transmitted by other terminal devices but without overloading the processing capabilities of the terminal devices or the available radio resources.

Referring to FIG. 6, processing starts in step T1. This may again correspond with the terminal device first being turned on or the ITS functionality being activated by an operator of the vehicle in which the terminal device is located.

In step T2, the terminal device 206 determines how many other terminal devices, n, it can detect D2D signalling from. This can be based on a straightforward count of the number of different terminal devices associated with the D2D communications currently being received (e.g. based on the messages received in a particular time window, such as a 5 second period prior to stet T2).

In step T3 the terminal device determines if n is less thank, which would indicate the terminal device is not detecting D2D transmissions from at least the minimum number of terminal devices with which it desired to be in communication. If n is less than k processing follows the branch marked "yes" to step T4.

In step T4 the terminal device determines if the transmission power P currently used for its own D2D transmissions would exceed the maximum power $P_{max}$ it can use for its D2D transmissions (e.g. determined by standardisation or the device's capabilities) if the transmission power P were to be adjusted upward by an increment a, where a corresponds with a step resolution of the power adjustment process being implemented.

If it is determined in step T4 that P+a<$P_{max}$, processing follows the branch marked "yes" to step T5 in which the transmission power for the terminal device's D2D transmissions is increased by the step increment a. It will be appreciated the magnitude of increment a may be selected according to the application at hand. For example, a smaller value for a will allow for more refined power adjustment, but with a correspondingly increase in the frequency of adjustments being made. Processing then proceeds to step T6 where there is a pause in the power adjustment process for a time Δt during which the terminal device continues making D2D associated with the ITS functionality at the present power level.

If it is determined in step T4 that P+a exceeds $P_{max}$, processing follows the branch marked "no" step T6 without increasing power.

Thus, steps T3, T4 and T5 correspond with the terminal device determining that it is not receiving signals from the desired minimum number of other terminal devices, and in response, increases its own transmission power, to the extent it is possible to do so without exceeding the maximum value.

Returning to step T3, if it is determined that n is not less than k (i.e. n is not less than the desired minimum number of other terminal devices from which to receive D2D transmissions), processing follows the branch marked "no" to T7.

In step T7 the terminal device determines if n is greater than l, which would indicate the terminal device is detecting D2D transmissions from more than the maximum number of terminal devices with which it desired to be in communication. If n is not determined to be greater than l in step T7, it can be deduced the terminal device is receiving D2D signalling from somewhere between k and l other terminal devices, which is considered to be within the acceptable range and does not require any power adjustment. Therefore processing follows the branch marked "no" from T7 to T6. If, however n is greater than l processing follows the branch marked "yes" to step T8.

In step T8 the terminal device determines if the transmission power P currently used for its own D2D transmissions would fall below the minimum power $P_{min}$ it can use for its D2D transmissions (e.g. as determined by standardisation or the device's capabilities) if the transmission power were to be adjusted downwards by an increment a.

If it is determined in step T8 that P−a>$P_{min}$, processing follows the branch marked "yes" to step T9 in which the transmission power for the terminal device's D2D transmissions is reduced by the step increment a. Processing then proceeds to step T6 where, as already noted above, there is a pause in the power adjustment process for time Δt during which the terminal device continues making D2D transmissions at the present power level.

If it is determined in step T8 that P−a is below $P_{min}$, processing follows the branch marked "no" to step T6 without reducing power.

Thus, steps T7, T8 and T9 correspond with the terminal device determining that it is receiving signals from more than the desired maximum number of other terminal devices, and in response, reduces its own transmission power, to the extent it is possible without falling below its minimum value.

Thus, FIG. 6 represents a process in which each terminal device autonomously determines its own transmission power level based on how many other terminal devices it can detect D2D transmissions from. With all terminal devices undertaking the same processing in synchrony, the net effect is a convergence to a situation in which each terminal device is transmitting at a power level which restricts the number of other terminal devices able to receive its D2D transmissions to within the range k to l. Of course as the vehicles comprising the terminal devices are moving on the road, the number of other terminal devices that can receive a given terminal device's transmissions may change, and the duration of the delay in step T6 may be selected according to the expected timescales over which these changes may be expected to become significant.

As noted above the setting of the threshold values k and l may be an implementation decision taking account of factors such as the impact of inter-device interference on the one hand, and the capacity available for allocating simultaneous D2D connections on the other hand. The adjustment step l increment value a may, for example, be a cell specific value set by higher layer signalling. Higher values of parameter a can be expected to provide for reaching convergence faster, but with more fluctuations in the transmission power settings of the terminal devices in the cell. Lower values for parameter a can be expected to provide for more stable overall terminal device power control behaviour, but with slower convergence. In principle the adjustment parameter a may be different for increase and decrease adjustments.

As noted above, improved cohesion can be obtained for the terminal devices in a communication group if their respective power adjustment processes (e.g. as schematically represented in FIG. 6) are synchronised with one another. In this regard the power adjustment process scheduling may be orchestrated by a network in which the terminal devices operate, for example through a base station type element or dedicated roadside unit.

Thus, FIGS. 5 and 6 schematically represented two examples of approaches by which terminal devices may adjust their transmission power levels to restrict the number of other terminal devices that can receive their signalling, and with all terminal devices doing this, there is an overall reduction in the potential for radio interference while still allowing nearest neighbour terminal devices to maintain communications. The transmit power setting for each terminal device can be adjusted based on calculations of radio path losses to respective ones of the other terminal devices, for example based on beacon signalling, or can be adjusted based on the number of other terminal devices that are detectable by the terminal device itself. For example, if the number of detectable devices falls under the threshold k, the transmit power may be increased as the traffic density has likely become lighter. On the other hand, if the number of detectable devices goes above the threshold l, the terminal device's transmit power should be decreased as the traffic density has likely become higher. This iterative behaviour can help maintain the number of other terminal devices able to receive a given terminal devices transmissions within a desired range on an ongoing basis.

One potential issue with the approaches described above is how to handle vehicles approaching from a side road, such as a vehicle associated with terminal device 208p is schematically represented in FIGS. 3 and 4. In FIGS. 3 and 4 the terminal device 206, and likewise all the other terminal device on the main road 220, have reduced their transmission powers so only a restricted number of other terminal devices can receive their respective D2D transmissions. This means the terminal devices associated with vehicles travelling on the main road 220 may be transmitting with insufficient power to allow the terminal device 208p travelling on the side road 230 to detect their signalling. Basically, the terminal device 208p may be unaware of the vehicles on the main road 220 until it is very close to the junction between the side road 230 and the main road 220. The terminal devices on the main road 220 may nonetheless receive signalling from the terminal device 208p on the side road region traffic. Indeed, the receipt of signalling from the terminal device 208p may in accordance with the process described above reference to FIG. 6 cause the terminal device on the main road to reduce their power further still. Whether or not this potential issue should be accounted for will depend on the application at hand, for example whether the ICS scheme supports junction related functionality.

One approach for handling the situation of a vehicle approaching from a side road being unable to receive D2D communications transmitted by vehicles on the main road is to allow vehicles on the main road to selectively increase their power. For example, individual terminal devices on the main road may be configured to randomly transmit at high power, e.g. maximum power, during one of the power adjustment cycles regardless of the number of other terminal devices they detect. The probability of an individual terminal device deciding to transmit at maximum power for a period of time in this way may be selected so that at any one time there are relatively few devices transmitting at maximum power so the transmit power convergence process among the terminal devices travelling on the main road is not significantly affected. Thus, the terminal device 208p approaching from the side road 230 will be more likely to receive transmissions from at least one of the terminal devices on the main road 220. In another approach, some of the of the terminal devices may be selected to act as what might be termed a master beacon and transmit at maximum power on a continuous basis. This will again allow vehicles on side roads to more quickly detect the traffic on the busier road. The terminal device selected to act as master beacon may be determined from network signalling, or any other means. The role of master beacon may be passed from terminal device to terminal device. In some implementations the terminal devices may be aware of the presence of the side road, for example from satellite navigation data, and may be configured to automatically increase their transmission power when they are approaching the junction. Since the terminal device 208p on the side road 220 may itself be implementing processing of the kind shown in FIG. 6, it may be beneficial for not all terminal devices on the main road to increase their power on approach to the junction, since this may cause the terminal device 208p on the side road to receive too many signals (i.e. more than k), and so reduce its own transmission power, thereby making it unable to exchange signalling with terminal devices on the main road. When the respective vehicles on the main road have passed the junction, they may return to scaling their transmission powers in accordance with the process described above. In another approach the respective terminal devices may transmit an indication of their velocity vector (i.e. their direction of travel). Any terminal device on the main road 220 that detects D2D signalling from the terminal device 208p on the side road 230 may determine from its velocity vector that it is on a crossing road, and as such the terminal device on the main road which detects this may automatically increase its own transmission power to allow the terminal device 208p on the side road to receive its D2D communications.

Thus, in accordance with some approaches for dealing with this issue, terminal devices may be configured to determine if a vehicle on a crossing road is detected, and if so determine if the terminal device is to increase its power so that it can be heard by the vehicle on the crossing road, and if so, increase its power for its D2D transmissions accordingly.

The example approaches described above have primarily focused on scenarios in which terminal devices determine appropriate power transmission levels among themselves, i.e. without any need for network control. Such approaches work, for example, whether in coverage or out of coverage of any controlling network infrastructure equipment, such as a base station or roadside unit.

Figure 7:
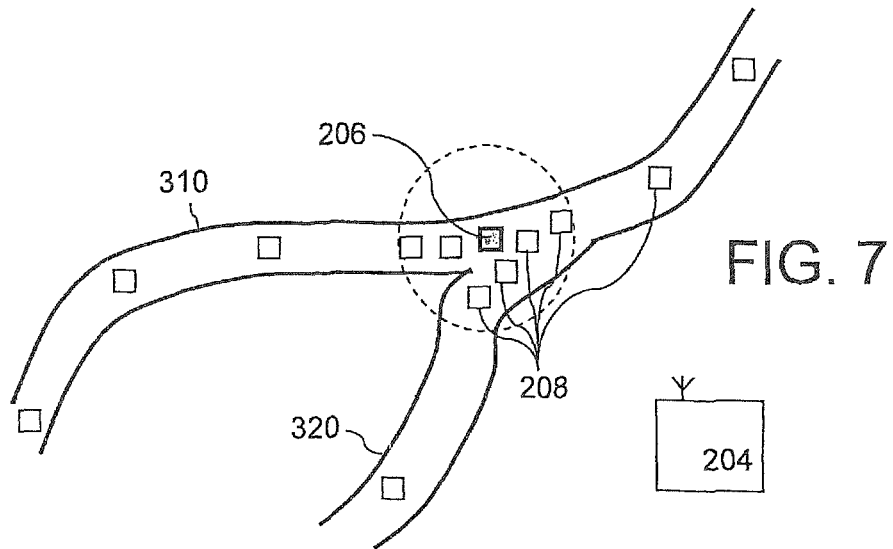
FIG. 7 schematically represents a scenario in which a base station controls power levels for D2D communications from a terminal device to a plurality of other terminal devices in accordance with some embodiments of the disclosure.

However, in some implementations there may be network infrastructure equipment which plays a role in controlling the transmission levels of terminal devices to ensure individual terminal devices D2D transmissions are only receivable by a restricted subset, e.g. a predetermined number or a number falling within a predetermined range, of surrounding terminal devices, and FIG. 7 schematically represents one scenario for such an implementation.

FIG. 7 schematically shows an intersection between a first road 310 and a second road 320. Also shown in FIG. 7 (as simple boxes) are vehicles comprising terminal devices 206, 208 supporting the D2D communications in accordance with certain embodiment of the disclosure. As is common, the traffic density represented in FIG. 7 can be seen to increase in the vicinity of the intersection. As for the examples described above, the processing in accordance with this example implementation will be described in respect of one of the terminal devices 206 (shown with shading in FIG. 7), but again it will be appreciated the same procedures will apply in respect of all the terminal devices actively involved in the ITS implementation. The terminal devices 206, 208 on the roads 310, 320 in the vicinity of the intersection are in coverage of network infrastructure equipment, in this example a base station, 204. The base station 204 is configured to communicate with the terminal devices 206, 208 to control the transmission powers of the respective terminal devices 206, 208 in accordance with certain embodiments of the disclosure.

Figure 8:
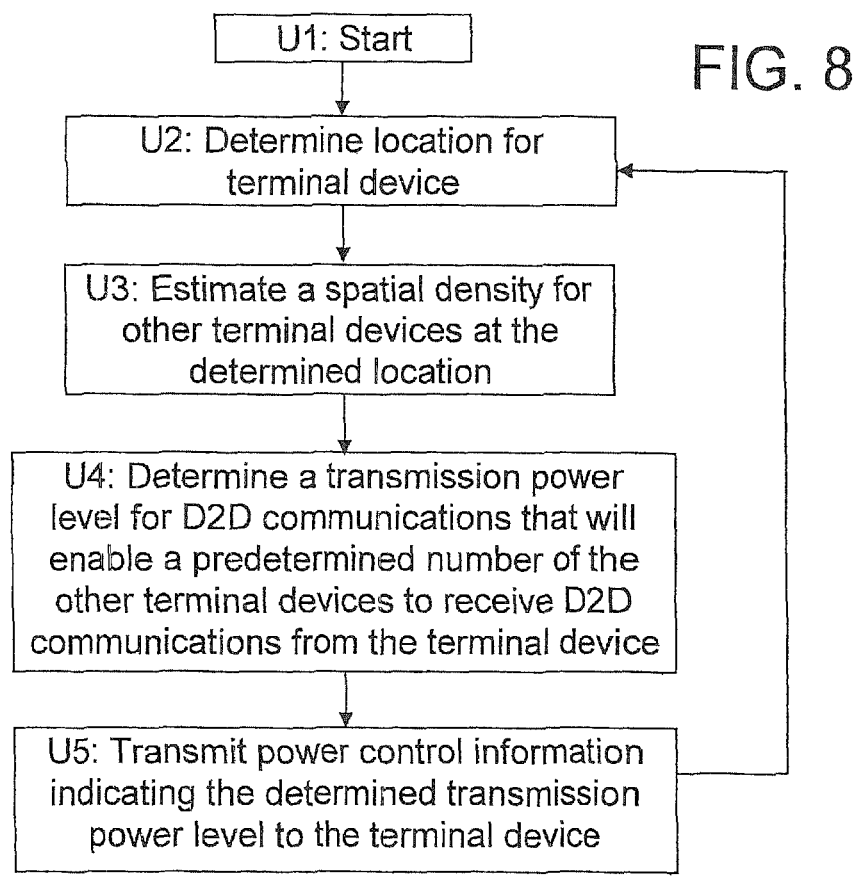
FIG. 8 is a flow diagram schematically representing a method of operating a base station, or other network infrastructure equipment, in accordance with some embodiments of the disclosure.

FIG. 8 is a flow diagram schematically representing a method of operating the base station 204 to control the transmission power of terminal device 206 in accordance with an embodiment of the disclosure.

Processing starts in step U1. In general, once the process is running it is performed in a repeating loop manner. In this regard the initial start point represented in FIG. 8 may correspond with when a new session is initiated. This may correspond, for example, with when the terminal device 206 is first switched on, or when the vehicle in which terminal device is arranged begins driving, or when an operator of the relevant vehicle activates the ITS functionality provided by the D2D communications discussed herein. Similarly, and although not shown in FIG. 8, the processing may continue repeating as described below until the process is terminated, for example with the terminal device being automatically deactivated once the vehicle is switched off, or a user deactivates the ITS functionality of the vehicle in which the terminal device is deployed.

In step U2 the base station 204 determines a location for the terminal device 206. This may be established in accordance with any conventional means. For example, the terminal device 206 may be associated with a global positioning system and convey an indication of location to the base station 204, or the base station may itself determine an estimate for the location of the terminal device 206, for example through coordinated triangulation with other base stations. It will be appreciated that an indication of where a terminal device is located may be determined with different degrees of resolution according to the implementation at hand. For example, in some cases the base station (or other network infrastructure equipment) may determine a specific location for a terminal device within its coverage area, whereas in other cases, the base station may simply determine the terminal device is located somewhere within its coverage area, for example based on the fact the terminal device has established a connection with the base station. That is to say, determining where a terminal devices located may comprise determining the terminal device is somewhere within what might be a relatively large geographic area, for example corresponding to the coverage area of a base station, without determining more specifically where the terminal device is located in the area.

In step U3 the base station 204 estimates a spatial density for terminal devices at the location determined for the first terminal device 206 in step U2. This may be done in a number of different ways. For example, the base station 204 may comprise a database of predicted traffic densities in different locations at different times, for example based on historically determined traffic management information, and may estimate a spatial density at the location of the terminal device from this information, for example taking account of the proportion of traffic expected to be involved in D2D communications for the ITS scheme. Alternatively, the base station may adopt a more crude approach that relies on only a small level of coarse spatial density estimates. For example the base station may simply assume a low spatial density if the terminal device is not located near a junction and may determine a high spatial density if the terminal device is located near a junction. In another approach, the base station may simply track the locations of all the different terminal devices connected to the base station, and establish an estimate of spatial density at different locations from this information. This information, combined with the location of actual roads under the base station coverage area, may be, for example, be used in setting a density specifically for a road, i.e. all the terminals on a first road would be set to have higher density and all the terminals on a second road would be set to have lower density. In a variation of this approach, the base station may simply determine an average traffic density within its coverage area from the number of connected devices associated with a particular ITS scheme. In this latter case, the spatial resolution of the spatial density estimates is relatively poor in that it in fact corresponds with the average density within the coverage area of the cell and so one potential drawback with this simple approach in some scenarios may be that different roads within the coverage area of the cell have significantly different densities. In some implementations the base station may estimate a spatial density from signalling received from terminal devices indicating the number of D2D transmissions they are receiving. For example, the terminal devices may be configured to communicate to the base station an indication of an estimate of the kind determined in association with step T2 in FIG. 6.

In step U4 the base station determines a transmission power level for the terminal device 206 to use for its D2D communications that will allow only a restricted subset of the other terminal devices to receive its D2D communications based on the estimate of spatial density at the terminal device's location. For example, if the base station 204 estimates there is a spatial density of 0.06 terminal devices per square meter surrounding the terminal device 206, and for the ITS implementation at hand it is considered appropriate for each terminal device to make D2D transmissions at a power level which allows the communications to be received by six other terminal devices, the base station 204 may determine a power level for the terminal device 206 that would allow its D2D transmissions to be received by other terminal devices within an area of 100 square meters (since this is the area that can be expected to contain six terminal devices in view of the determined spatial traffic density). It will be appreciated simple geometric considerations can be applied to take account of the fact vehicles will generally be distributed in relatively narrow bands (i.e. constrained to the roads), rather than distributed uniformly across the horizontal plane, when determining the appropriate power level to reach the desired number of vehicles for the estimated spatial density.

In step U5 the base station transmits power control information to the terminal device 206 to indicate the determined transmission power level for the terminal device to use for its D2D transmissions. This communication may be established in accordance with any conventional control signalling techniques, for example based generally on existing TPC signalling. Consequently, the terminal device 206 may proceed to undertake D2D transmissions at the established power level. The base station may then, after a pause corresponding to a desired repetition rate for the power adjustment cycle, return to step T2 for another iteration.

In some examples the return from step U5 to step U2 may not be performed very frequently in recognition of the fact the base station-based estimates of traffic density may be relatively coarse in terms of their spatial and/or temporal resolution, and in that sense may not be expected to change very quickly. For example, in one implementation the processing of FIG. 8 may start when a terminal device first enters a communication cell supported by the base station, i.e. just after handover, and may not be repeated for that terminal device while it remains in that cell. In this case, when the terminal device exits a cell and enters another cell under the control of another base station it may receive updated power control information.

Thus, by way of a general summary, in accordance with some example implementations of approaches in accordance with the present disclosure there is provided a wireless telecommunications system comprising a plurality of terminal devices operable to communicate with one another in a device-to-device manner, wherein respective ones of the terminal devices are configured to determine the number of other terminal devices able to receive their device-to-device transmissions for a given transmission power level (i.e. the number of other terminal devices within range of their device-to-device transmissions for a given transmission power level), and to select a transmission power so as to restrict the number of terminal devices able to receive their device-to-device transmissions (i.e. to select a transmission power so as to restrict the number of terminal devices within range of the device-to-device transmissions).

It will be appreciated that while some of the above-described embodiments have focused on examples in which a base station of the wireless telecommunications system is providing functionality in accordance with the principles described herein, in other implementations similar functionality may be provided by other components of the wireless telecommunications network infrastructure. For example, some, or all, of the processing described above in relation to the base station may be provided by a core network component of the wireless telecommunications system and/or similar functionality may be provided by other infrastructure elements, such as relay nodes and/or dedicated units for supporting an ITS scheme, for example roadside units (RSUs) deployed in association with a road network to facilitate vehicle-to-vehicle communications in accordance with previously proposed schemes. In this regard a base station may be considered as one example of network infrastructure equipment and maybe configured to provide functionality of the kind described herein.

Thus there has been described a terminal device for use in a wireless telecommunications system comprising a plurality of terminal devices operable to communicate with one another in a device-to-device manner, wherein the terminal device comprises a controller unit and a transceiver unit configured to operate together to cause the terminal device to determine a transmission power level to use for device-to-device transmissions from the terminal device to restrict the number of the other terminal devices able to receive the device-to-device transmissions to a restricted subset of the other terminal devices, and to transmit device-to-device communications using the determined transmission power level. The terminal device may determine the transmission power itself or from control signalling reads received from network infrastructure equipment, such as a base station or roadside unit.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A terminal device for use in a wireless telecommunications system comprising a plurality of terminal devices operable to communicate with one another in a device-to-device manner, wherein the terminal device comprises a controller unit and a transceiver unit configured to operate together to cause the terminal device to determine a transmission power level to use for device-to-device transmissions from the terminal device to restrict the number of the other terminal devices able to receive the device-to-device transmissions to a restricted subset of the other terminal devices, and to transmit device-to-device communications using the determined transmission power level.

Paragraph 2. The terminal device of paragraph 1, wherein the restricted subset of the other terminal devices comprises a predetermined number of the other terminal devices.

Paragraph 3. The terminal device paragraph 1 or 2, wherein the device-to-device communications from the terminal device are broadcast to the terminal devices comprising the restricted subset of the other terminal devices.

Paragraph 4. The terminal device of any of paragraphs 1 to 3, wherein the terminal device is configured to receive beacon signalling from respective ones of the other terminal devices and to determine from the beacon signalling a radio propagation loss for a radio path between the terminal device and respective ones of the other terminal devices, and wherein the terminal device is operable to determine the transmission power level to use to restrict the number of the other terminal devices able to receive its device-to-device communications based on the propagation losses determined for respective ones of the other terminal devices.

Paragraph 5. The terminal device of any of paragraphs 1 to 4, wherein the terminal device is configured to transmit beacon signalling to allow respective ones of the other terminal devices to determine a radio propagation loss for a radio path between themselves and the terminal device.

Paragraph 6. The terminal device of any of paragraphs 1 to 5, wherein the terminal device is configured to determine a number of other terminal devices from which it can detect device-to-device transmissions, and to determine a transmission power level to use for device-to-device transmissions based on the number of other terminal devices from which it can detect device-to-device transmissions.

Paragraph 7. The terminal device of paragraph 6, wherein the terminal device is configured to determine a transmission power level to use for device-to-device transmissions based on the number of other terminal devices from which it can detect device-to-device transmissions by comparing the number of other terminal devices from which it can detect device-to-device transmissions with a desired number of other terminal devices which are able to receive the terminal device's device-to-device transmissions.

Paragraph 8. The terminal device of paragraph 6 or 7, wherein the terminal device is configured to increase its transmission power for its device-to-device transmissions if the number of other terminal devices from which it can detect device-to-device transmissions is less than a threshold amount.

Paragraph 9. The terminal device of any one of paragraphs 6 to 8, wherein the terminal device is configured to reduce its transmission power for its device-to-device transmissions if the number of other terminal devices from which it can detect device-to-device transmissions is greater than a threshold amount.

Paragraph 10. The terminal device of any of paragraphs 1 to 9, wherein the terminal device is configured to repeatedly perform the steps of determining a transmission power level to use for device-to-device transmissions from the terminal device to restrict the number of the other terminal devices able to receive the device-to-device transmissions to a restricted subset of the other terminal devices and transmitting device-to-device communications using the determined transmission power level.

Paragraph 11. The terminal device of any of paragraphs 1 to 10, wherein the terminal device is a component of a vehicle and the device-to-device communications from the terminal device relate to the operation of the vehicle.

Paragraph 12. The terminal device of any of paragraphs 1 to 11, wherein the terminal device is configured to selectively transmit device-to-device communications using a transmission power that is higher than the determined transmission power level in response to one or more of: (i) the terminal device determining that it is in the vicinity of a road junction; (ii) the terminal device receiving device-to-device transmissions from another terminal device indicating the other terminal device is heading towards a road on which the terminal device is travelling; (iii) receiving control information from one of the other terminal devices which indicate the terminal device should increase its transmission power; (iv) receiving control information from a base station of the wireless telecommunications system which indicates the terminal device should increase its transmission power.

Paragraph 13. The terminal device of any of paragraphs 1 to 12, wherein the wireless telecommunications system is configured to operate in accordance with a mobile cellular telecommunications standard.

Paragraph 14. The terminal device of any of paragraphs 1 to 13, wherein the wireless telecommunications system comprises a base station and the terminal devices are further operable to communicate with the base station.

Paragraph 15. Integrated circuitry for a terminal device in a wireless telecommunications system comprising a plurality of terminal devices operable to communicate with one another in a device-to-device manner, wherein the integrated circuitry comprises a controller element and a transceiver element configured to operate together to cause the terminal device to determine a transmission power level to use for device-to-device transmissions from the terminal device to restrict the number of the other terminal devices able to receive the device-to-device transmissions to a restricted subset of the other terminal devices, and to transmit device-to-device communications using the determined transmission power level.

Paragraph 16. A method of operating a terminal device in a wireless telecommunications system comprising a plurality of terminal devices operable to communicate with one another in a device-to-device manner, wherein the method comprises determining a transmission power level to use for device-to-device transmissions from the terminal device to restrict the number of the other terminal devices able to receive the device-to-device transmissions to a restricted subset of the other terminal devices, and transmitting device-to-device communications using the determined transmission power level.

Paragraph 17. Network infrastructure equipment for use in a wireless telecommunications system comprising the network infrastructure equipment and a plurality of terminal devices operable to communicate with one another in a device-to-device manner, wherein the network infrastructure equipment comprises a controller unit and a transceiver unit configured to operate together to cause the network infrastructure element to determine an indication of where a terminal device is located, and, based on the indication of where a terminal device is located, determine a transmission power level for the terminal device to use for device-to-device transmissions to restrict the number of other terminal devices able to receive the device-to-device transmissions to a restricted subset of the other terminal devices, and to communicate power control information to the terminal device to cause the terminal device to use the determined transmission power level for device-to-device communications.

Paragraph 18. The network infrastructure equipment of paragraph 17, wherein the network infrastructure equipment is configured to determine the transmission power level for the terminal device to restrict the number of other terminal devices able to receive its device-to-device communications by establishing an estimate of the spatial density of terminal devices for where the terminal device is located.

Paragraph 19. The network infrastructure equipment of paragraph 18, wherein the network infrastructure equipment is configured to establish an estimate of the spatial density of terminal devices for where the terminal device is located by determining where other terminal devices in the vicinity of the terminal device are located and/or from a pre-defined model of the spatial density of terminal devices for where the terminal device is located and/or from an estimate of the number of terminal devices connected to the network infrastructure equipment.

Paragraph 20. The network infrastructure equipment of any of paragraphs 17 to 19, wherein the indication of where a terminal device is located comprises an indication the terminal device is within a coverage area for the network infrastructure equipment.

Paragraph 21. The network infrastructure equipment of any of paragraphs 17 to 20, wherein the network infrastructure equipment comprises a base station and/or a roadside component of an intelligent transport system.

Paragraph 22. Integrated circuitry for network infrastructure equipment in a wireless telecommunications system comprising the network infrastructure equipment and a plurality of terminal devices operable to communicate with one another in a device-to-device manner, wherein the integrated circuitry comprises a controller element and a transceiver element configured to operate together to cause the network infrastructure equipment to determine an indication of where a terminal device is located, and, based on the indication of where a terminal device is located, determine a transmission power level for the terminal device to use for device-to-device transmissions to restrict the number of other terminal devices able to receive the device-to-device transmissions to a restricted subset of the other terminal devices, and to communicate power control information to the terminal device to cause the terminal device to use the determined transmission power level for device-to-device communications.

Paragraph 23. A method of operating network infrastructure equipment in a wireless telecommunications system comprising the network infrastructure equipment and a plurality of terminal devices operable to communicate with one another in a device-to-device manner, wherein the method comprises determining an indication of where a terminal device is located, and, based on the indication of where a terminal device is located, determining a transmission power level for the terminal device to use for device-to-device transmissions to restrict the number of other terminal devices able to receive the device-to-device transmissions to a restricted subset of the other terminal devices, and communicating power control information to the terminal device to cause the terminal device to use the determined transmission power level for device-to-device communications.

Paragraph 24. A wireless telecommunications system comprising a plurality of terminal devices operable to communicate with one another in a device-to-device manner and network infrastructure equipment, wherein at least one of the terminal devices comprises the terminal device of any of paragraphs 1 to 16 and/or the network infrastructure equipment comprises the network infrastructure equipment of any of paragraphs 17 to 21.

REFERENCES

[1] EP 2 276 012
[2] US 2013/0336120
[3] Holma H. and Toskala A., "LTE for UMTS OFDMA and SC-FDMA based radio access", John Wiley and Sons, 2009

What is claimed is:
1. A terminal device for use in a wireless telecommunications system comprising a plurality of terminal devices operable to communicate with one another in a device-to-device manner, wherein the terminal device comprises:
  circuitry configured to:
    determine a number of other terminal devices from which the terminal device can detect device-to-device transmissions;

determine a transmission power level to use for device-to-device transmissions from the terminal device to restrict the number of the other terminal devices able to receive the device-to-device transmissions to a restricted subset of the other terminal devices by comparing the number of other terminal devices from which it can detect device-to-device transmissions with a desired number of other terminal devices which are able to receive the terminal device's device-to-device transmissions; and transmit device-to-device communications using the determined transmission power level.

2. The terminal device of claim 1, wherein the restricted subset of the other terminal devices comprises a predetermined number of the other terminal devices.

3. The terminal device of claim 1, wherein the device-to-device communications from the terminal device are broadcast to the terminal devices comprising the restricted subset of the other terminal devices.

4. The terminal device of claim 1, wherein the terminal device is configured to receive beacon signalling from respective ones of the other terminal devices and to determine from the beacon signalling a radio propagation loss for a radio path between the terminal device and respective ones of the other terminal devices, and wherein the terminal device is operable to determine the transmission power level to use to restrict the number of the other terminal devices able to receive its device-to-device communications based on the propagation losses determined for respective ones of the other terminal devices.

5. The terminal device of claim 1, wherein the terminal device is configured to transmit beacon signalling to allow respective ones of the other terminal devices to determine a radio propagation loss for a radio path between themselves and the terminal device.

6. The terminal device of claim 1, wherein the terminal device is configured to increase the transmission power for the device-to-device transmissions if the number of other terminal devices from which it can detect device-to-device transmissions is less than a threshold amount.

7. The terminal device of claim 1, wherein the terminal device is configured to reduce the transmission power for the device-to-device transmissions if the number of other terminal devices from which it can detect device-to-device transmissions is greater than a threshold amount.

8. The terminal device of claim 1, wherein the terminal device is configured to repeatedly perform the steps of determining a transmission power level to use for device-to-device transmissions from the terminal device to restrict the number of the other terminal devices able to receive the device-to-device transmissions to a restricted subset of the other terminal devices and transmitting device-to-device communications using the determined transmission power level.

9. The terminal device of claim 1, wherein the terminal device is a component of a vehicle and the device-to-device communications from the terminal device relate to the operation of the vehicle.

10. The terminal device of claim 9, wherein the terminal device is configured to selectively transmit device-to-device communications using a transmission power that is higher than the determined transmission power level in response to one or more of: (i) the terminal device determining that it is in the vicinity of a road junction; (ii) the terminal device receiving device-to-device transmissions from another terminal device indicating the other terminal device is heading towards a road on which the terminal device is travelling; (iii) receiving control information from one of the other terminal devices which indicate the terminal device should increase its transmission power; (iv) receiving control information from a base station of the wireless telecommunications system which indicates the terminal device should increase its transmission power.

11. The terminal device of claim 1, wherein the wireless telecommunications system is configured to operate in accordance with a mobile cellular telecommunications standard.

12. The terminal device of claim 1, wherein the wireless telecommunications system comprises a base station and the terminal devices are further operable to communicate with the base station.

13. Circuitry for a terminal device in a wireless telecommunications system comprising a plurality of terminal devices operable to communicate with one another in a device-to-device manner, wherein the circuitry comprises:
a controller element and a transceiver element configured to operate together to cause the terminal device to
determine a number of other terminal devices from which the terminal device can detect device-to-device transmissions;
determine a transmission power level to use for device-to-device transmissions from the terminal device to restrict the number of the other terminal devices able to receive the device-to-device transmissions to a restricted subset of the other terminal devices by comparing the number of other terminal devices from which it can detect device-to-device transmissions with a desired number of other terminal devices which are able to receive the terminal device's device-to-device transmissions; and
transmit device-to-device communications using the determined transmission power level.

14. A method of operating a terminal device in a wireless telecommunications system comprising a plurality of terminal devices operable to communicate with one another in a device-to-device manner, wherein the method comprises:
determining a number of other terminal devices from which the terminal device can detect device-to-device transmissions;
determining a transmission power level to use for device-to-device transmissions from the terminal device to restrict the number of the other terminal devices able to receive the device-to-device transmissions to a restricted subset of the other terminal devices by comparing the number of other terminal devices from which it can detect device-to-device transmissions with a desired number of other terminal devices which are able to receive the terminal device's device-to-device transmissions; and
transmitting device-to-device communications using the determined transmission power level.

15. The circuitry of claim 13, wherein the controller element is configured to increase the transmission power for the device-to-device transmissions if the number of other terminal devices from which it can detect device-to-device transmissions is less than a threshold amount.

16. The circuitry of claim 13, wherein the controller element is configured to reduce the transmission power for the device-to-device transmissions if the number of other terminal devices from which it can detect device-to-device transmissions is greater than a threshold amount.

17. The method of claim 14, further comprising:
increasing the transmission power for the device-to-device transmissions if the number of other terminal devices from which it can detect device-to-device transmissions is less than a threshold amount.

18. The method of claim 14, further comprising:
reducing the transmission power for the device-to-device transmissions if the number of other terminal devices from which it can detect device-to-device transmissions is greater than a threshold amount.

* * * * *